(12) United States Patent
Gaudron et al.

(10) Patent No.: US 8,192,122 B2
(45) Date of Patent: Jun. 5, 2012

(54) ANCHOR BOLT

(75) Inventors: Paul Gaudron, Stratford, CT (US); Jacob Olsen, Roselle, IL (US)

(73) Assignee: Powers Fasteners, Inc., Brewster, NY (US)

( * ) Notice: Subject to any disclaimer, the term of this patent is extended or adjusted under 35 U.S.C. 154(b) by 0 days.

(21) Appl. No.: 12/542,178

(22) Filed: Aug. 17, 2009

(65) Prior Publication Data
US 2011/0038684 A1    Feb. 17, 2011

(51) Int. Cl.
*F16B 13/06* (2006.01)
(52) U.S. Cl. .............. 411/60.1; 411/32; 411/35; 411/37; 411/44; 411/60.2; 411/63; 411/75; 411/78
(58) Field of Classification Search .......... 411/60.1, 411/60.2, 32, 35, 37, 44, 55, 57.1, 63, 71, 411/75, 78
See application file for complete search history.

(56) References Cited

U.S. PATENT DOCUMENTS

| | | | | |
|---|---|---|---|---|
| 1,278,025 A | * | 9/1918 | Salmons | 411/32 |
| 1,755,264 A | * | 4/1930 | Mirzan | 411/60.2 |
| 2,139,167 A | * | 12/1938 | Marshall | 411/55 |
| 2,904,820 A | * | 9/1959 | Flora | 16/86 A |
| 2,933,969 A | * | 4/1960 | Huyssen | 411/345 |
| 3,017,800 A | * | 1/1962 | Cohen | 411/34 |
| 3,171,322 A | * | 3/1965 | Kaplan | 411/60.1 |
| 3,192,822 A | * | 7/1965 | Genter | 411/44 |
| 3,283,640 A | * | 11/1966 | Ono | 411/33 |
| 3,512,328 A | * | 5/1970 | Gustaf | 52/787.1 |
| 3,941,028 A | * | 3/1976 | Lobello et al. | 411/55 |
| 4,516,885 A | * | 5/1985 | Calandra, Jr. | 405/259.6 |
| 4,530,630 A | * | 7/1985 | Brown | 411/340 |
| 4,854,793 A | * | 8/1989 | Ollivier et al. | 411/49 |
| 4,946,325 A | * | 8/1990 | Abraham | 411/24 |
| 5,180,264 A | * | 1/1993 | Farwell | 411/32 |
| 5,203,647 A | * | 4/1993 | Blackwell | 405/259.1 |
| 5,219,248 A | * | 6/1993 | Wright | 405/259.4 |
| 5,253,962 A | * | 10/1993 | Close, Jr. | 411/34 |
| 5,288,190 A | * | 2/1994 | Winkeljann et al. | 411/55 |
| 5,344,257 A | * | 9/1994 | Wright et al. | 405/259.4 |
| 5,593,261 A | * | 1/1997 | Giannuzzi et al. | 411/55 |
| 5,685,678 A | * | 11/1997 | Giannuzzi et al. | 411/55 |
| 5,702,216 A | * | 12/1997 | Wu | 411/32 |
| 5,813,808 A | * | 9/1998 | Wu | 411/32 |
| 5,816,759 A | * | 10/1998 | Ernst et al. | 411/24 |
| 6,579,049 B2 | * | 6/2003 | Kaibach | 411/61 |
| 6,827,535 B2 | * | 12/2004 | Fuchs et al. | 411/44 |
| 6,942,439 B2 | * | 9/2005 | Rouger | 411/61 |
| 7,357,613 B2 | * | 4/2008 | Houck et al. | 411/60.3 |
| 2003/0063959 A1 | * | 4/2003 | Kao | 411/60.2 |
| 2004/0253075 A1 | * | 12/2004 | Liebig et al. | 411/57.1 |

* cited by examiner

*Primary Examiner* — Victor Batson
*Assistant Examiner* — Roberta Delisle
(74) *Attorney, Agent, or Firm* — Cantor Colburn LLP

(57) ABSTRACT

An anchor bolt for use in a hole in a base material is provided and includes a stud, a sleeve disposed about the stud and a retainer nut, disposed in operable communication with the stud and having a dimension measured from a central axis of the hole that is at least as large as a corresponding dimension of the hole.

16 Claims, 3 Drawing Sheets

ANCHOR BOLT

BACKGROUND

An anchor bolt is typically used to attach objects or structures to a base material. The general components of an anchor bolt are a stud, a wedge and a sleeve portion. In use, a hole is drilled or otherwise formed in the base material that has a diameter only slightly larger than that of the wedge and the sleeve of the anchor bolt. This allows passage of the wedge and the sleeve of the anchor bolt into the hole. Upon rotation of the stud, the wedge moves axially along the stud and, due to the abutment between the wedge and the sleeve, causes an expansion of the sleeve. The expansion of the sleeve causes the anchor bolt to thereby become anchored in the base material.

The proper function of anchor bolts as described above in part relies on the presence of friction between the wedge and the sleeve to inhibit rotation of the wedge relative to the sleeve. A lack of sufficient friction, however, can result in the wedge simply rotating along with the stud and, therefore, failing to move axially along the stud. In such a case, the expansion of the sleeve may not occur and the ability of the anchor bolt to become anchored in the base material may be reduced.

SUMMARY OF THE INVENTION

According to one aspect of the invention, an anchor bolt for use in a hole in a base material is provided and includes a stud, a sleeve disposed about the stud and a retainer nut, disposed in operable communication with the stud to urge a wedge toward the sleeve, the retainer nut having a dimension measured from a central axis of the hole that is at least as large as a corresponding dimension of the hole.

According to another aspect of the invention, an anchor bolt for use in a hole in a base material is provided and include a stud, a sleeve disposed about the stud and a retainer nut, disposed in operable communication with the stud and having a dimension measured from a central axis of the hole that is at least as large as a corresponding dimension of the hole.

According to yet another aspect of the invention, a method of assembling an anchor bolt for use in a hole in a base material is provided and includes disposing a sleeve about a stud and placing a retainer nut, having a dimension measured from a central axis of the hole that is at least as large as a corresponding dimension of the hole, in operable communication with the stud.

BRIEF DESCRIPTION OF THE FIGURES

The following descriptions should not be considered limiting in any way. With reference to the accompanying drawings, like elements are numbered alike.

DETAILED DESCRIPTION

A detailed description of the hereinafter described embodiments of the disclosed apparatus and method are presented herein by way of exemplification and not limitation with reference to the Figures.

Figure 1:
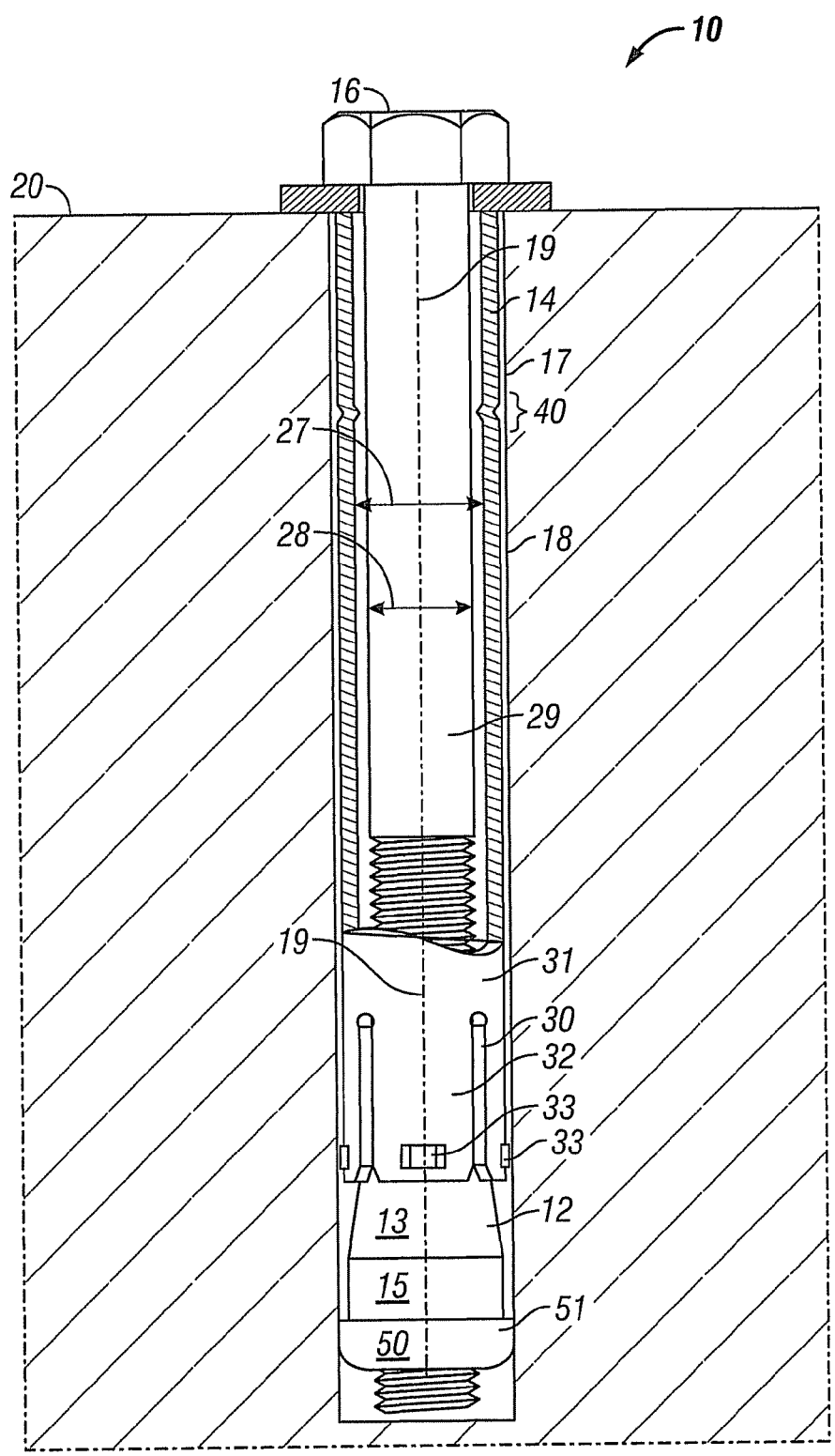
FIG. 1 is a side view of an anchor bolt according to an embodiment of the present invention.
Figure 2:
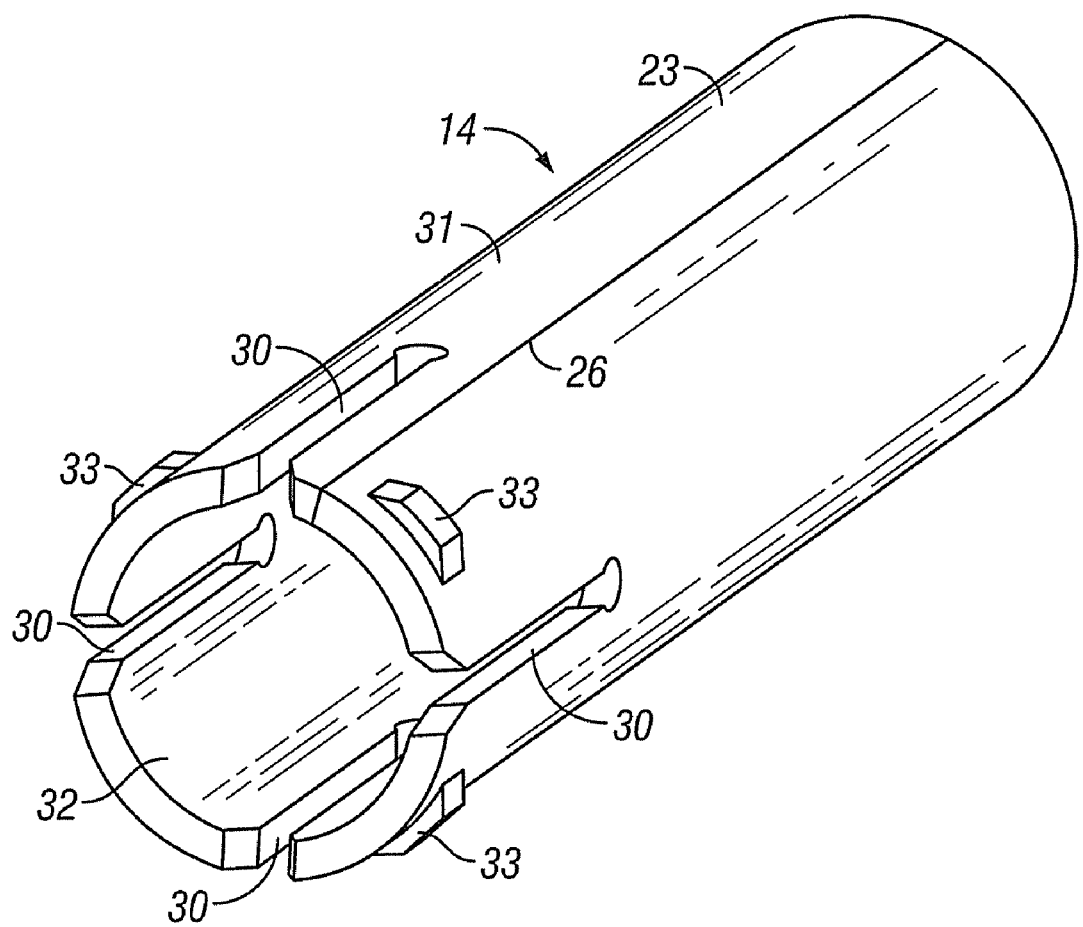
FIG. 2 is a perspective view of a sleeve of the anchor bolt of FIG. 1.

Referring to FIGS. 1 and 2, an anchor bolt 10 for use with a hole 18 in a base material 20 is provided. The anchor bolt 10 includes a stud 16, a sleeve 14 disposed about the stud and a retainer nut 50. The retainer nut 50 is disposed in operable communication with the stud 16 and has a dimension, such as a radial width measured from a central axis 19 of the hole 18, that is at least as large as a corresponding dimension of the hole 18, such as a radial width of the hole 18 that is also measured from the central axis.

The anchor bolt 10 may further include a wedge 12, which is to be urged toward the sleeve 14 by the retainer nut 50 in accordance with an operation of the stud 16 where the stud 16 operation may be a rotation of the stud 16 that is resisted by the retainer nut 50 and, in some cases, the wedge 12. The wedge 12 may include a plug nut 15 and a frustoconical leading end 13 having a rear end abutted by a leading surface of the plug nut 15. Although it is not required as will be discussed below, the wedge 12 and the retainer nut 50 may each be threadably engaged with the stud 16.

With the retainer nut 50 in operable communication with the stud 16, an operation of the stud 16, which may include a rotation of the stud 16, is resisted by the retainer nut 50 such that the retainer nut 50 moves axially along the stud 16 relative to the sleeve 14. The axial movement of the retainer nut 50 urges the wedge 12 toward the sleeve 14 such that the leading end 13 radially expands the sleeve 14. Where the anchor bolt 10 is installed in the hole 18, the radial expansion of the sleeve 14 results in a frictional engagement between the sleeve 14 and walls 17 of the hole 18.

The sleeve 14 is sized to be expandably receptive to the wedge 12. That is, the sleeve 14 has an inner diameter 27 that is greater than an outer diameter 28 of a shank 29 of the stud 16. As such, the shank 29 is free to rotate within the sleeve 14.

An expandability of the sleeve 14 may be facilitated by formation of at least one longitudinal opening 30, such as a slot, in a wall 31 of the sleeve 14. The longitudinal opening(s) 30 allow a portion 32 of the sleeve 14 to be radially deflected without the necessity of stretching the material of the sleeve 14 or an opening up of seam 26, which may run longitudinally along a length of the sleeve 14. In other embodiments, the sleeve 14 may be configured for being stretched without the presence of the longitudinal opening 30. Additional features may also be formed in the sleeve 14. For example, gripping projections 33 may be disposed on the sleeve 14 to increase friction between the walls 17 and the sleeve 14. The gripping projections 33 are shown as being oriented in a latitudinal direction but may be provided in various shapes with various orientations.

The sleeve 14 may further include a compression ring 40 defined along a length thereof. The compression ring 40 is a portion of the sleeve 14 at which the inner diameter 27 of the sleeve 14 is locally decreased and may serve to radially locate the stud 16 within the annular space in an interior of the sleeve 14 and, in some cases, further serves to ease the resistance of the sleeve 14 to expansion.

The resistance of the retainer nut 50 to the stud 16 operation may be derived by the retainer nut 50 being formed to be movable in the axial direction of the hole 18 but not to be rotatable about the central axis 19 of the hole 18. As such, in an exemplary configuration in which the retainer nut 50 is threadably engaged with the stud 16 and the stud 16 is rotated, the threaded engagement forces the retainer nut 50, which cannot rotate with the stud 16, to move in an axial direction.

The retainer nut 50 may include a flange section 51 that is sized such that the retainer nut 50 has a dimension, such as a radial width measured from the central axis 19 of the hole 18, that is at least as large or larger as a corresponding dimension of the hole 18, such as a radial width of the hole 18 measured from the central axis 19. The retainer nut 50 may be formed from a pliable material, such as plastic, that allows the retainer nut 50 to be squeezed into and maneuvered up or down through the hole 18 but still resists rotation about the axis of the hole 18.

Figure 3:
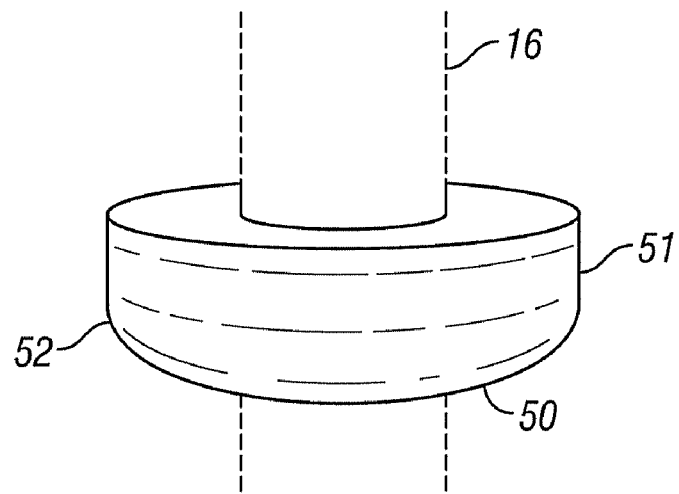
FIG. 3 is a perspective view of an exemplary retainer nut of the anchor bolt of FIG. 1.
Figure 4:
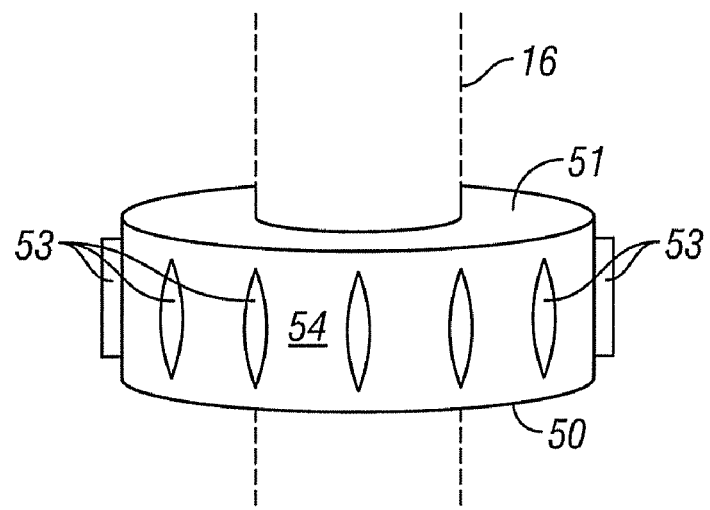
FIG. 4 is a perspective view of an exemplary retainer nut of the anchor bolt of FIG. 1.

The flange section 51 may be formed in various shapes, sizes and configurations. As shown in FIGS. 1 and 3, the flange section 51 may be formed as a nut with zero, one or two rounded edges 52. In an alternate or additional example, shown in FIG. 4, the flange section 51 is formed as a set of one or more radial protrusions 53 that extend from a radially centralized hub 54 to at least an interior diameter of the walls 17. The radial protrusions 53 may be streamlined in only an axial direction such that they allow for axial movement of the retainer nut 50 but not rotational movement thereof.

The retainer nut 50 and the wedge 12 may be provided as a single component or as separate components. Where the retainer nut 50 and the wedge 12 are a single component, the retainer nut 50 may be formed integrally with a rear surface of the plug nut 15. Where the retainer nut 50 and the wedge are separate components, the retainer nut 50 is placed in operable communication with the stud 16 independently from the wedge 12. In either case, an operation of the stud 16 causes the retainer nut 50 to move axially along the stud 16 such that the retainer nut 50 urges the wedge 12 toward the sleeve 14.

In accordance with further embodiments of the invention, it is understood that the threading of the wedge 12 and the retainer nut 50 is not required and that other configurations are possible. In particular, the wedge 12 may be formed without threading with the cooperation between the retainer nut 50 and stud 16 threading providing the sole force for axial movement of the retainer nut 50 and the wedge 12 along the stud 16 relative to the sleeve 14.

In accordance with another aspect of the invention, a method of assembling an anchor bolt for use in a hole 18 in a base material 20 is provided and includes disposing a sleeve 14 about a stud 16 and placing a retainer nut 50, having a dimension measured from a central axis 19 of the hole 18 that is at least as large as a corresponding dimension of the hole 18, in operable communication with the stud 16.

The method may further include interposing a wedge 12, which is either integrally connected with the retainer nut 50 or separate from the retainer nut 50, between the retainer nut 50 and the sleeve 14. Also, the retainer nut 50 may be installed in the hole 18 subsequent to the placing operation or prior to the placing operation.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An anchor bolt for use in a hole in a base material, comprising:
    a stud;
    a sleeve disposed about the stud;
    a wedge, which is axially movable along the stud into a sleeve expansion position and, when occupying the sleeve expansion position, rotatable about a longitudinal axis of the stud relative to the sleeve; and
    a retainer nut, disposed in operable communication with the stud to urge the wedge toward the sleeve and into the sleeve expansion position, the retainer nut having a dimension measured from a central axis of the hole that is at least as large as a corresponding dimension of the hole.

2. The anchor bolt according to claim 1, wherein the retainer nut is formed of a pliable material.

3. The anchor bolt according to claim 1, wherein a material of the retainer nut comprises plastic.

4. The anchor bolt according to claim 1, wherein the dimension comprises a radial width of the retainer nut.

5. The anchor bolt according to claim 1, wherein the retainer nut dimension is larger than the corresponding hole dimension.

6. The anchor bolt according to claim 1, wherein the retainer nut comprises threading formed on an interior diameter thereof.

7. The anchor bolt according to claim 1, wherein the retainer nut comprises a flange section at an exterior diameter thereof.

8. The anchor bolt according to claim 7, wherein the flange section comprises a rounded edge.

9. The anchor bolt according to claim 1, wherein the retainer nut is a separate component from the wedge.

10. The anchor bolt according to claim 1, wherein the retainer nut is integrally connected to the wedge.

11. An anchor bolt for use in a hole in a base material, comprising:
    a stud;
    a sleeve disposed about the stud;
    a wedge, which is axially movable along the stud into a sleeve expansion position and, when occupying the sleeve expansion position, rotatable about a longitudinal axis of the stud relative to the sleeve; and
    a retainer nut, disposed in operable communication with the stud and having a dimension measured from a central axis of the hole that is at least as large as a corresponding dimension of the hole.

12. A method of assembling an anchor bolt for use in a hole in a base material, the method comprising:
    disposing a sleeve about a stud;
    disposing a wedge to be axially movable along the stud into a sleeve expansion position such that, when occupying the sleeve expansion position, the wedge is rotatable about a longitudinal axis of the stud relative to the sleeve; and
    placing a retainer nut, having a dimension measured from a central axis of the hole that is at least as large as a corresponding dimension of the hole, in operable communication with the stud.

13. The method according to claim 12, further comprising interposing a wedge integrally connected with the retainer nut between the retainer nut and the sleeve.

14. The method according to claim 12, further comprising interposing a wedge separate from the retainer nut between the retainer nut and the sleeve.

15. The method according to claim 12, further comprising installing the retainer nut in the hole subsequent to the placing.

16. The method according to claim 12, further comprising installing the retainer nut in the hole prior to the placing.

* * * * *